US008112838B2

(12) United States Patent
Matlack et al.

(10) Patent No.: US 8,112,838 B2
(45) Date of Patent: Feb. 14, 2012

(54) FRICTION STIR WELDING TOOL CLEANING APPARATUS

(75) Inventors: Michael P. Matlack, St. Charles, MO (US); Kurt A. Burton, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 266 days.

(21) Appl. No.: 12/622,429

(22) Filed: Nov. 19, 2009

(65) Prior Publication Data

US 2010/0065092 A1    Mar. 18, 2010

Related U.S. Application Data

(62) Division of application No. 11/451,729, filed on Jun. 13, 2006, now Pat. No. 7,641,739.

(51) Int. Cl.
*A46B 13/04* (2006.01)

(52) U.S. Cl. ........... 15/21.1; 15/88; 15/93.1; 15/104.02; 15/104.04; 15/104.05

(58) Field of Classification Search ............ 15/21.1, 15/88, 93.1, 104.02, 104.04, 104.05; 134/105
See application file for complete search history.

(56) References Cited

U.S. PATENT DOCUMENTS

| 1,674,236 | A | | 6/1928 | Bauer |
| 3,044,907 | A | * | 7/1962 | Bernhardt ......................... 134/5 |
| 3,487,841 | A | | 1/1970 | Goodrum |
| 4,426,749 | A | | 1/1984 | Long |
| 4,583,257 | A | * | 4/1986 | Bridges et al. ................. 15/93.1 |
| 5,070,568 | A | * | 12/1991 | Wilcox et al. .................. 15/93.1 |
| 7,121,448 | B2 | | 10/2006 | Subramanian et al. |
| 2005/0022631 | A1 | | 2/2005 | Brazil |
| 2005/0045694 | A1 | | 3/2005 | Subramanian et al. |

FOREIGN PATENT DOCUMENTS

JP    2006167729    6/2006

OTHER PUBLICATIONS

UKIPO Combined Search and Examination Report for GB0711438.2, Sep. 18, 2007.

* cited by examiner

*Primary Examiner* — Robert Scruggs

(57) ABSTRACT

The disclosure provides for a friction stir welding tool cleaning method and apparatus for fixed and retractable pin tools. The method and apparatus use a heating component, a temperature indicator component, a controller component, and a rotatable tool cleaner component for cleaning fixed pin tools. An additional bore cleaner component is used for cleaning retractable pin tools. Heat is applied to a friction stir welding tool having a surface with weld process residue material until the process residue material is sufficiently plasticized, and then the tool cleaner component is applied to the heated tool to remove the plasticized residue on the pin and shoulder surfaces of the tool, and for retractable pin tools, the bore cleaner component is applied to the heated tool to remove the plasticized residue in the tool bore.

20 Claims, 9 Drawing Sheets

FRICTION STIR WELDING TOOL CLEANING APPARATUS

CROSS-REFERENCE TO RELATED APPLICATION

The application is a divisional of and claims priority to U.S. application Ser. No. 11/451,729, filed on Jun. 13, 2006, and entitled, "FRICTION STIR WELDING TOOL CLEANING METHOD", the entire content of which is expressly incorporated herein by reference.

BACKGROUND

1) Field of the Disclosure

The disclosure relates to friction stir welding, and more specifically, to a friction stir welding tool cleaning method and apparatus.

2) Description of Related Art

Friction stir welding is a process that combines extruding and forging and is specifically designed for welding aluminum extrusions and other metal extrusions. Friction stir welding is a process in which a rotating cylindrical tool, that includes a threaded pin or probe attached to a shoulder that may be scrolled, concave or of another suitable configuration, is slowly plunged into or through a workpiece in order to join multiple structural members of the workpiece in a solid state or to repair cracks in the workpiece. FIG. 1 shows a conventional friction stir welding device. As shown in FIG. 1, a tool 10 includes a pin 12 that typically extends from a shoulder 14, which can be concave, flat or otherwise contoured. The shoulder 14 is urged against structural member 16, so that the pin 12 is urged into structural members 16, 18. The pin 12 is then urged through structural members 16, 18 to form a continuous weld joint 20. For example, according to one conventional friction stir welding process for forming a weld joint 20, a friction stir welding machine (not shown) urges the pin 12 in a direction 22 and into an interface 24 defined by two overlapping structural members 16, 18. The rotating tool 10 is then moved in a direction 26 along the interface 24. The motion of the rotating tool 10 generates frictional and deformation heating, thereby forming a region of plasticized material in the structural members 16, 18. This heat causes the workpiece material to soften without reaching the melting point and allows the tool to traverse the weld line. As it does, the plasticized material is transferred from the front edge of the welding tool to the trail edge of the tool shoulder and pin, where it joins the pieces being welded. Upon cooling of the plasticized material, the members 16, 18 of the workpiece are joined along the weld joint 20. Because the frictional heat generated by the welding tool plasticizes the material within the weld joint, the plasticized material must be constrained to prevent the material from flowing out of the weld joint and also must be consolidated to minimize porosity and provide a weld joint having the desired surface finish.

Friction stir welding processes typically use either a fixed pin tool or a retractable pin tool. A fixed pin tool is a unitary piece of the pin portion and the shoulder portion. A retractable pin tool is a pin portion that is separate from the shoulder portion, and the pin is inserted into the shoulder and may be adjustable in height. During conventional friction stir welding processes, the fixed pin tool or retractable pin tool collects weld process residue material depending on the material or materials being welded, such as aluminum residue or titanium residue. When using a retractable pin tool during welding, excess weld process residue material builds up between the shoulder's inside diameter and the pin tool's outside diameter and can inhibit the load sensed by a system controller, such as a force control device, possibly causing an over plunge of the pin tool due to false readings in the axial direction. False readings can result in uncertainty about the quality of the weld. In addition, if more load is applied due to a false reading, the tools can over penetrate the surface and dig into the welding components, thus destroying the part. This loading effect can also inhibit correct torque readings making adaptive control much more difficult. When using a fixed pin tool during welding, weld process residue build-up limits the optical inspection of tools and may inhibit a decision to continue or to limit use of that tool. If tools are checked electronically or with a laser system, the residue build-up may imply that the tool integrity is unacceptable when, in fact, a tool change may not be required and the necessary action would be to clean the tool before the inspection process. Friction stir welding tools are easier to inspect for damage if they are cleaned properly.

Known methods for cleaning friction stir welding tools having weld process residue material exist. One known method involves cleaning the friction stir welding tools having weld process residue material with a pick or small screw driver. However, this method is time consuming and tedious, and it may take hours to thoroughly clean the tools. In addition, this method may not remove all of the residue material on the tools. A second known method involves chemically removing the residue through an acid bath process. This cleaning method involves chemically etching the residue material off the friction stir weld tools. For example, with aluminum residue, a sodium hydroxide bath is typically applied. However, this method is also time consuming and can take up to 24 hours to complete. In addition, acid bath residue, such as sodium hydroxide residue, may be present on the outside of the tools after they are chemically etched, and the tools must be additionally heat treated to remove the acid bath residue. A third known cleaning method involves heating the residue build-up with a blow torch and then picking off the heated residue material with a pick or small screw driver. However, this method can be risky, and damage to the tool can occur because the high temperature cannot be adequately controlled. For example, if the tools are heat treated at too high a temperature, the heat may anneal the material and alter the heat treatment property of the tools, and then the tools may be damaged and cannot be used in the friction stir welding process. Accordingly, there is a need for an improved friction stir welding tool cleaning method and apparatus that does not have the problems associated with known cleaning methods and devices.

SUMMARY

The method and apparatus disclosed herein satisfy this need for an improved friction stir welding tool cleaning method and apparatus, as well as provides a unique and advantageous friction stir welding tool cleaning method and apparatus. None of the known cleaning methods and devices provides all of the numerous advantages disclosed herein. The disclosure provides a unique and nonobvious friction stir welding tool cleaning method and apparatus that can be used with fixed and retractable tools used in the friction stir welding process to remove weld process residue material from the friction stir welding tool. Unlike known cleaning methods and devices, the friction stir welding tool cleaning method and apparatus provides the following advantages: it is easy to use; it is less expensive than chemically removing the residue; it is less tedious than manually removing the residue; it provides improved cleaning of friction stir welding tools allowing for reduced inspection cycles for damaged and embedded materials; it can significantly reduce the time to clean the friction stir welding tool of weld process residue material that gets pushed into pin and shoulder areas; it provides a method and apparatus that enhances the inspection process, eliminates or minimizes tool changes that are not required, and allows for precise load and torque measurements critical for adaptive and load control modes; and it provides a method and apparatus that improves cycle time and reduces the cost of friction stir welding.

In an embodiment of the disclosure, there is provided an apparatus for cleaning a friction stir welding tool having a weld process residue material on a surface of the tool. The apparatus comprises: a heating component for heating the friction stir welding tool to an effective temperature, such that the process residue material is heated and transformed from a solid process residue material to a plasticized process residue material; a temperature indicator component for indicating the effective temperature of the friction stir welding tool; a tool cleaner component adapted for removing the plasticized process residue material from the friction stir welding tool, wherein when the effective temperature is reached, the tool cleaner component contacts and removes the plasticized process residue material from the tool; and, a controller component for distributing power to the heating component, to the temperature indicator component, and to the tool cleaner component. If the friction stir welding tool has a retractable pin tool component, the apparatus further comprises a bore cleaner component adapted for cleaning an inner portion of a shoulder portion of the friction stir welding tool when the effective temperature is reached, such that the bore cleaner component contacts and removes the plasticized process residue material from the inner portion of the shoulder portion of the tool.

In another embodiment of the disclosure, there is provided a method for cleaning a friction stir welding tool having a weld process residue material on a surface of the tool. The method comprises the steps of: activating a friction stir welding machine so that the friction stir welding tool having the process residue material moves in a first rotational direction; heating for an effective period of time the friction stir welding tool having the process residue until the tool reaches an effective temperature, such that the process residue material is heated and transformed from a solid process residue material to a plasticized process residue material; contacting the friction stir welding tool with a tool cleaner component when the effective temperature is attained, rotating the tool cleaner component in a second rotational direction opposite to the first rotational direction, and removing with the tool cleaner component the plasticized process residue material from the surface of the tool for an effective period of time until all or substantially all of the residue material is removed from the surface of the tool; and cooling the friction stir welding tool to ambient temperature. If the friction stir welding tool has a retractable pin tool component, the method further comprises the step, before the cooling step, of contacting an inner portion of a shoulder portion of the friction stir welding tool with a bore cleaner component when the tool reaches an effective temperature, and removing with the bore cleaner component the plasticized process residue material from the inner portion for an effective period of time until all or substantially all of the residue material is removed from the inner portion of the shoulder portion of the tool.

BRIEF DESCRIPTION OF THE DRAWINGS

The foregoing and other advantages and features disclosed herein, and the manner in which the same are accomplished, will become more readily apparent upon consideration of the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all embodiments are shown. Indeed, several different embodiments may be provided in several different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 2:
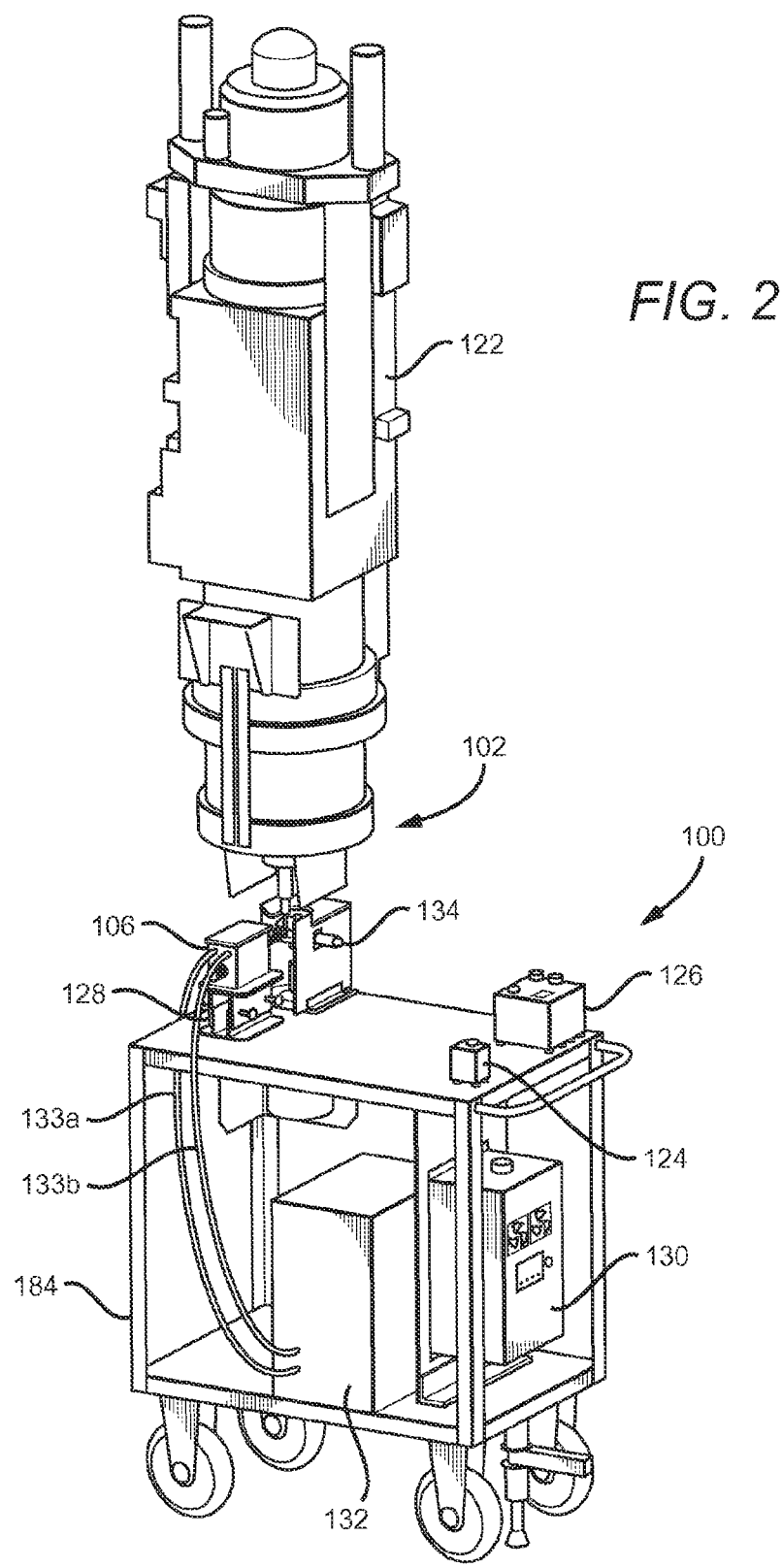
FIG. 2 is a perspective view illustrating a conventional friction stir welding spindle and the friction stir welding tool cleaning apparatus according to one embodiment of the disclosure.
Figure 6:
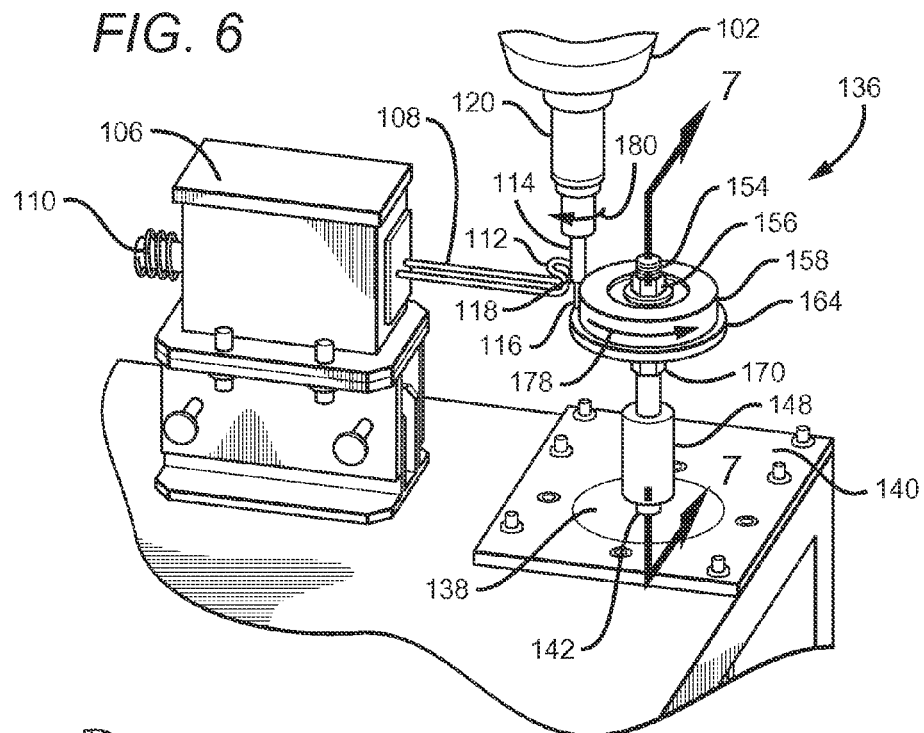
FIG. 6 is a side perspective view illustrating various components of the friction stir welding tool cleaning apparatus of FIG. 2, including the induction coil and tool cleaner component.

Referring now to the drawings, and in particular, to FIG. 2, there is shown an apparatus and system 100 for cleaning friction stir welding tools. The apparatus and system integrate a solid state, medium frequency, induction heating component with a powered rotating tool cleaner component, a temperature indicator component, and a separate controller component. The apparatus 100 is preferably used with a conventional friction stir welding machine 102. An example of a friction stir welding machine that may be used with the disclosed embodiments is one such as manufactured by Brotje of Germany. However, other suitable friction stir welding machines may also be used. As shown more particularly in FIGS. 3 and 4, the apparatus 100 comprises a heating component 104. Preferably, the heating component is an induction heater or transformer 106 having an induction coil 108. As shown in FIG. 6, the induction coil 108 has a first end 110 and a second end 112. The first end 110 is attached to the induction heater 106, and the second end 112 extends in a lateral direction away from the induction heater and is in close proximity to a rotatable tool 114 of the friction stir welding machine 102. The rotatable tool 114 comprises pin 116 and shoulder 118, where the pin 116 extends in a longitudinal downward direction from the shoulder. The tool is preferably formed of an alloy material having a high strength, low fatigue, high tensile fitness, and high heat resistance. More preferably, the tool is made of MP 159, a steel alloy containing such metals as cobalt, nickel, chromium, iron, and other metals. The tool may also be formed of other suitable alloys. The tool 114 is attached to friction stir welding tool holder 120 which is, in turn, attached to friction stir welding spindle 122.

An on-off button 124 controls power to the apparatus 100. When the on-off button is switched to an "on" position, the apparatus is turned on. When the apparatus is turned on, the controller 126 is activated. Controller 126 controls the temperature of the induction heater, the set point of the temperature, the heat cycle, and also controls other components of the apparatus 100. The controller 126 is electronically connected to the induction heater 106 and controls the temperature and temperature set point of the induction heater. The induction heater 106 is configured to induce heat around the tool 114, such that tool 114 is resistively heated to a desired temperature. Preferably, the induction heater may be similar to one such as obtained from Magneforce Inc. of Michigan. The preferred heater is one that does not anneal the tool. The height of the induction heater 106 may be raised or lowered via a height adjustment apparatus 128 positioned at an area below the induction heater 106.

Figure 5:
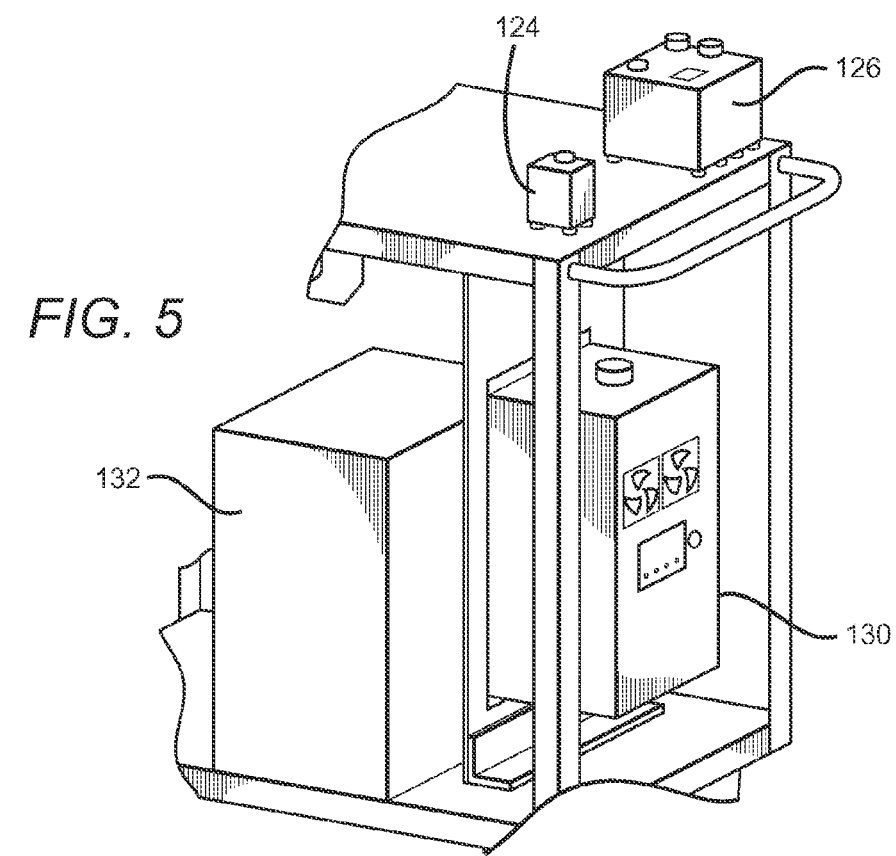
FIG. 5 is an enlarged view illustrating various components of the friction stir welding tool cleaning apparatus of FIG. 2, including the controller component.

As shown in FIG. 5, the apparatus and system 100 further comprises a power supply component 130. The power supply 130 is electronically connected to the induction heater 106. The power supply 130 may be similar to one such as obtained from Magneforce Inc. of Michigan. The power supply 130 is preferably coupled to a water circulator 132. The water circulator runs water through the induction heating component to regulate and cool the temperature of the induction coil 108. The water circulator may be connected to the induction heater via circulator lines or tubes 133a, 133b (see FIG. 3). The water circulator 132 may be similar to one such as obtained from Magneforce Inc. of Michigan.

Figure 1:
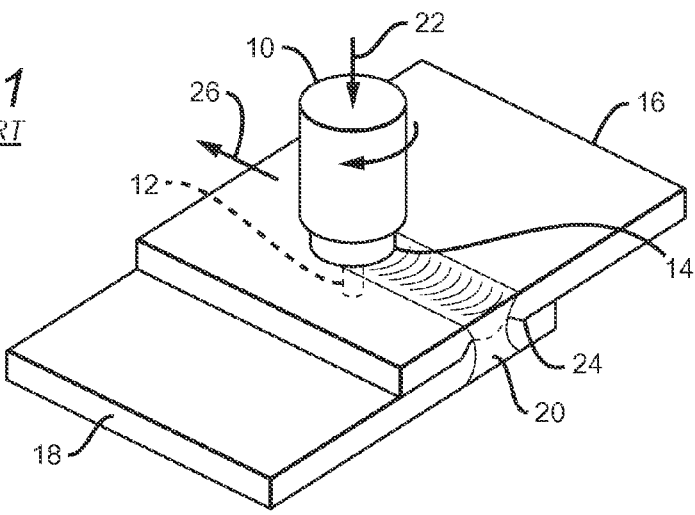
FIG. 1 is a perspective view illustrating a prior art conventional friction stir welding device configured to form a friction stir weld lap joint between two overlapping structural members.
Figure 3:
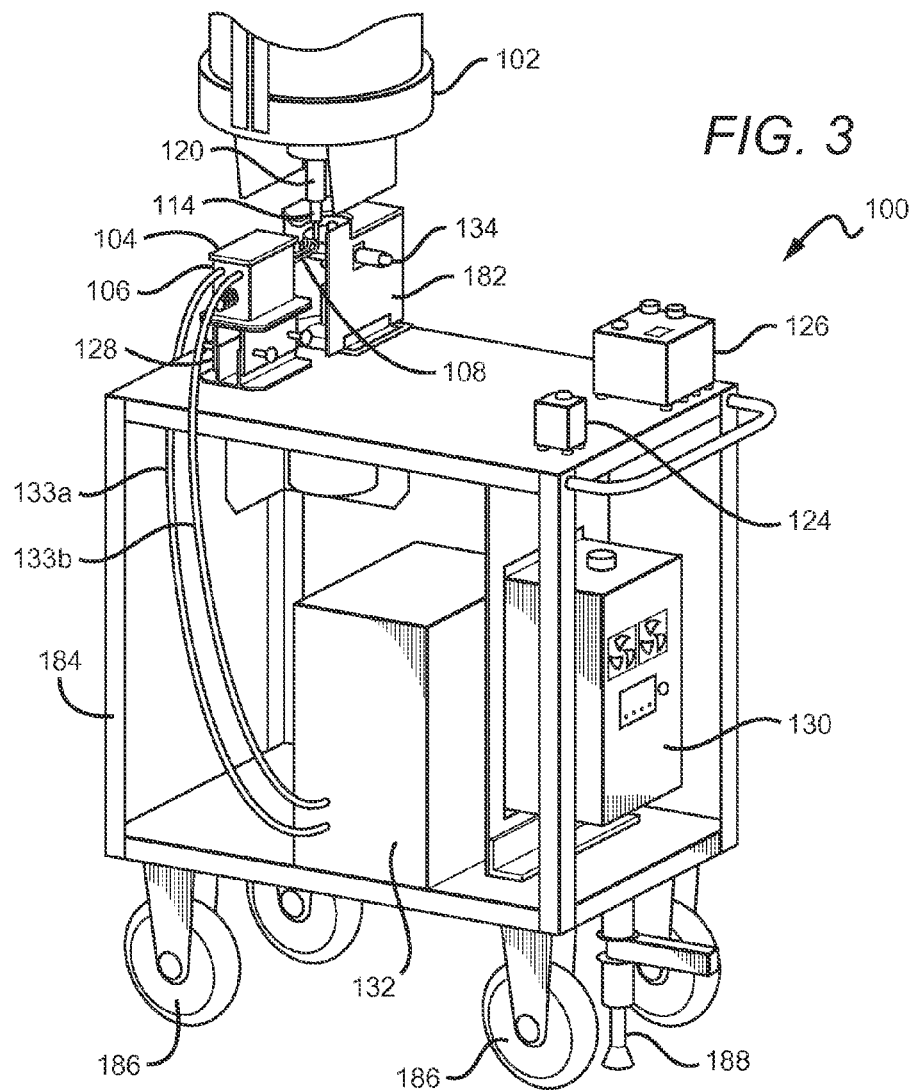
FIG. 3 is an enlarged view illustrating a portion of the friction stir welding spindle and the friction stir welding tool cleaning apparatus of FIG. 2.
Figure 4:
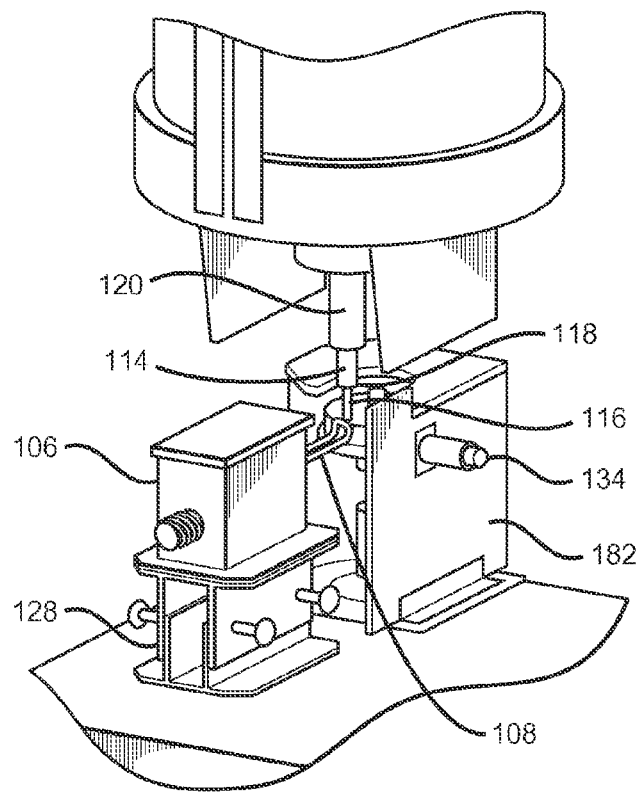
FIG. 4 is an enlarged view illustrating a portion of the friction stir welding spindle and various components of the friction stir welding tool cleaning apparatus of FIG. 2, including the heating component and temperature indicator component.

As shown in FIGS. 2-4, the cleaning apparatus and system 100 further comprises a temperature indicator component 134. Preferably, the temperature indicator component 134 is an optical pyrometer, such as an optical pyrometer similar to one such as obtained from Omega Engineering, Inc. of Stamford, Conn. The temperature indicator component may also be an infrared device or any suitable non-contact device that reads temperatures. The temperature indicator component 134 reads the temperature of the tool that is heated by the induction heater 106. The optical pyrometer may also be a two color pyrometer, and may incorporate a time soak cycle.

Figure 7:
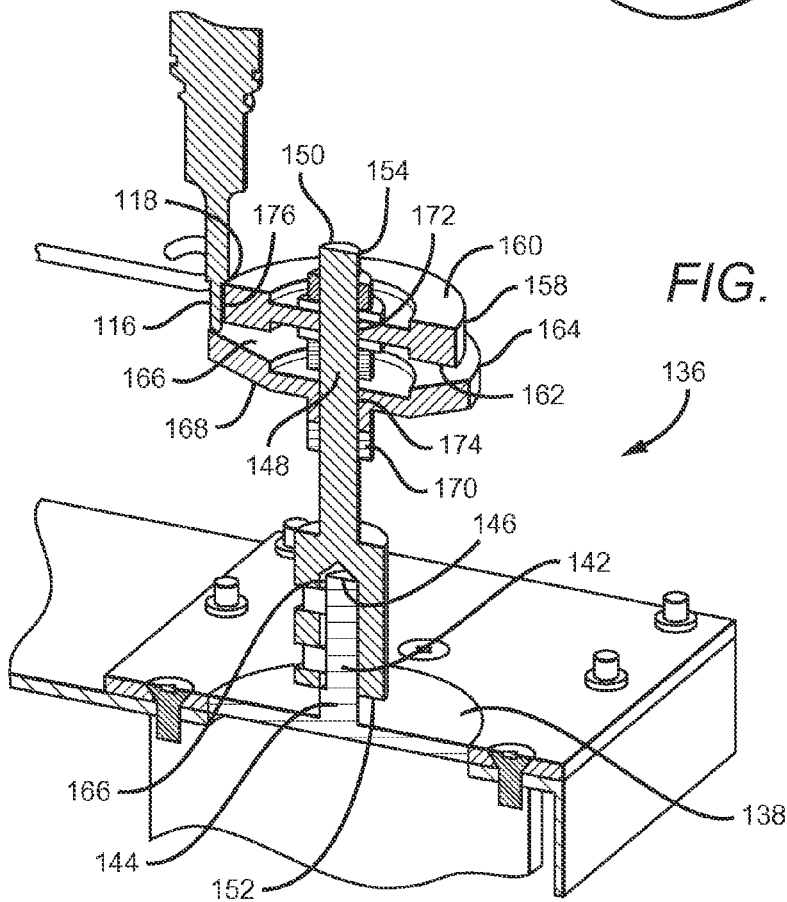
FIG. 7 is a cross-sectional view taken along lines 7-7 of FIG. 6.

As particularly shown in FIGS. 6-7, the cleaning apparatus and system 100 further comprises a tool cleaner component 136 preferably positioned opposite the induction heater 106. The tool cleaner component 136 preferably comprises a motor 138 coupled to a platform 140. Preferably, the motor 138 is positioned on and within the platform 140. A motor shaft 142 having a first end 144 and a second end 146 is attached to the motor. The motor shaft 142 is preferably configured in a cylindrical shape with the first end 144 attached to the motor 138 and the second end 146 extending vertically upward from the motor. An arbor 148 having a first end 150 and a second end 152 is attached to the motor shaft 142 and is preferably attached over and around the motor shaft. The arbor has a threaded portion 154 at the first end 150 that is adapted for receiving one or more nut elements and one or more wire wheels. First nut element 156 is coupled to arbor 148 and a first wire wheel 158 having a top surface 160 and a bottom surface 162 is coupled to the arbor with the bottom surface 162 adjacent to the first nut element 156. A second wire wheel 164 having a top surface 166 and a bottom surface 168 is coupled to the arbor with the bottom surface 168 adjacent to the top surface 160 of the first wire wheel 158. Second nut element 170 is coupled to arbor 148 adjacent the top surface 166 of the second wire wheel. Preferably, two wire wheels are used. However, more than two wire wheels may be used depending on the length of the threaded portion of the arbor and depending on how many wire wheels can fit on the threaded portion of the arbor. The motor is preferably a one-half horsepower motor, such as one manufactured by McMaster-Carr of Chicago, Ill., and that runs at about 3450 revolutions per minute (rpms). However, other suitable motors may also be used. The arbor 148 extends through a central opening 172 in the first wire wheel and extends through a central opening 174 in the second wire wheel. Preferably, the first wire wheel and the second wire wheel are substantially circular in shape and rotate in the same direction when the tool cleaner component is activated. The first and second wire wheels are positioned so that they abut the tool 114 of the friction stir welding spindle, and in particular, abut the pin 116 and the shoulder 118. Each of the first and second wire wheels includes a plurality of wire elements (not shown) that may be attached at location 176 and extend from the circumference of each of the wire wheels and form a brush-like component, so that when the tool cleaner component is activated, the wire elements brush and clean the tool 114. The tool cleaner component 136 is turned on by the on-off button 124 and controlled by the controller 126. When the tool cleaner component 136 is activated, the first and second wire wheels rotate in direction 178. Simultaneously, the friction stir welding tool rotates in a direction 180 that is counter to or opposite to the direction 178 of the wire wheels. When activated, the first and second wire wheels preferably rotate at a rate of less than 3500 revolutions per minute (rpm). More preferably, the first and second wire wheels rotate at a rate of 900 revolutions per minute (rpm). When activated, the friction stir welding tool preferably rotates at a rate of 900 to 1200 revolutions per minute (rpm). Preferably, the wire wheels are made of stainless steel. Preferably, the arbor, motor and motor shaft are made of mild steel or tool steel. Preferably, the wire wheels are similar to ones such as manufactured by McMaster-Carr of Chicago, Ill. The wire wheels of the tool cleaner component are specifically designed to contact and remove the weld residue process material that adheres to the friction stir welding tool as a result of the welding process. The process residue material typically comprises aluminum, copper, bronze, zinc, plastic or another type of soft metal. The wire wheels of the tool cleaner component clean and remove weld process residue material from the bottom surface of the shoulder tool and from the exterior surface of the pin, either a fixed pin tool or a retractable pin tool or another type of pin tool. It is advantageous to clean the residue from the shoulder and pin to enhance the inspection process, eliminate or minimize tool changes that are not required, and allow for precise load and torque measurements critical for adaptive and load control modes.

As shown in FIG. 4, the tool cleaner may be shielded by a safety enclosure or shield 182. The safety enclosure is preferably made of plexiglass or lexan polycarbonate. The safety enclosure is designed to prevent unwanted weld process residue material from flying out and hitting users of the apparatus when the tool is being cleaned with the apparatus and method. In addition, if the wire wheels start to break down, the safety enclosure prevents shards or pieces of stainless steel that detach from the wire wheels from hitting users of the apparatus.

The cleaning apparatus and system 100 may be portable by being placed on and secured to a mobile cart 184 having wheels 186 and a floor lock 188 (see FIGS. 2-3). Preferably, the cart is made of heavy duty steel or another durable and heavy material, and preferably, the cart may be easily moved to a desired location so that the cleaning apparatus and system can be positioned in close proximity to a friction stir welding machine. Alternatively, the apparatus 100 may be permanently mounted on a stand (not shown) or other stationary device, depending on the system configuration.

Figure 8:
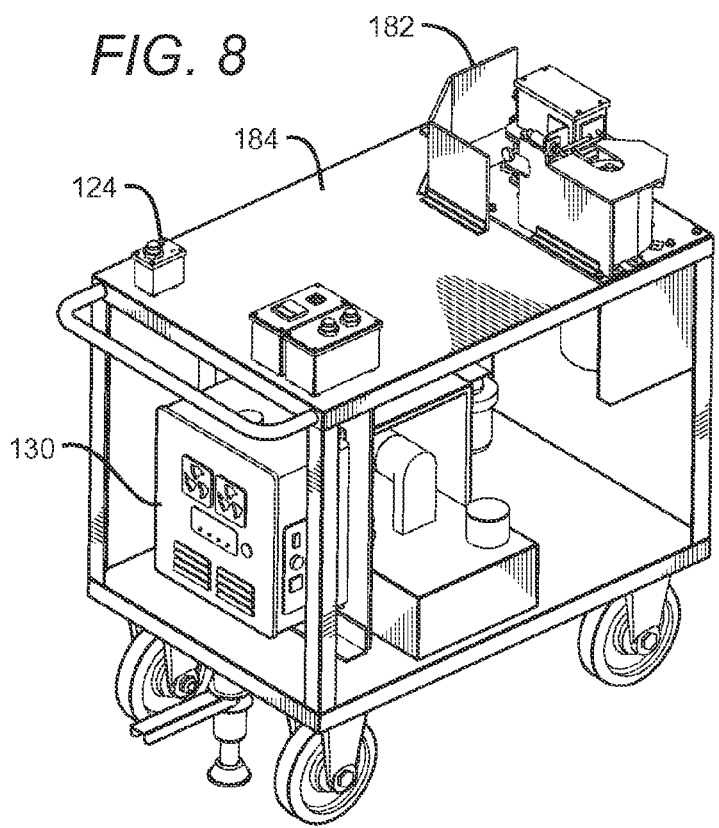
FIG. 8 is a top perspective view illustrating another embodiment of the friction stir welding tool cleaning apparatus of the disclosure including further safety enclosures and the bore cleaner component.
Figure 9:
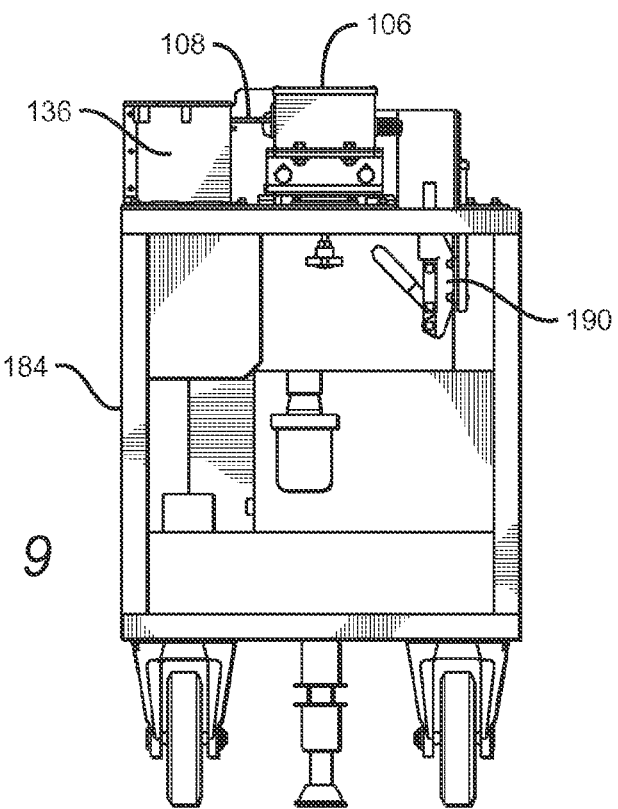
FIG. 9 is a back view illustrating the friction stir welding tool cleaning apparatus of FIG. 8.
Figure 10:
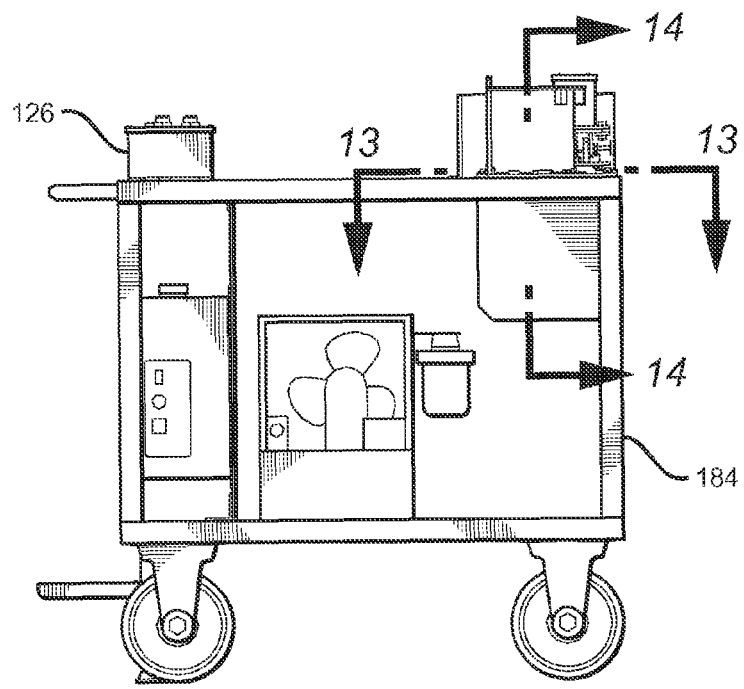
FIG. 10 is a right side view illustrating the friction stir welding tool cleaning apparatus of FIG. 8.
Figure 11:
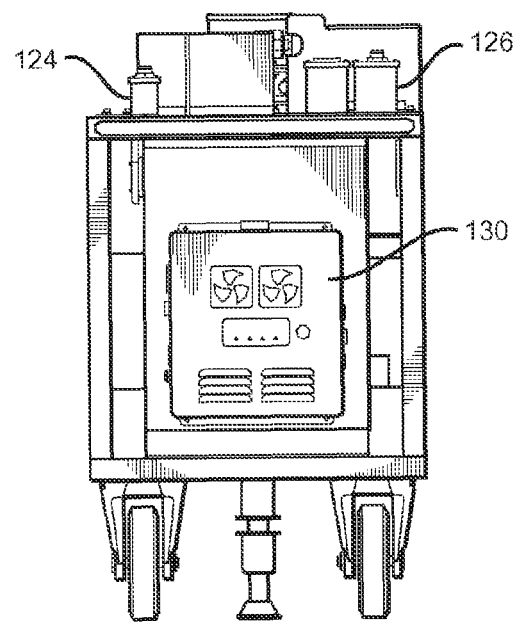
FIG. 11 is a front view illustrating the friction stir welding tool cleaning apparatus of FIG. 8.
Figure 12:
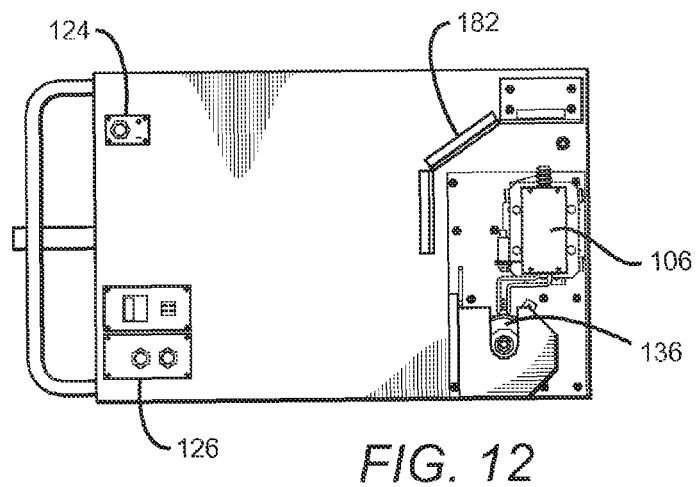
FIG. 12 is a top view illustrating the friction stir welding tool cleaning apparatus of FIG. 8.
Figure 13:
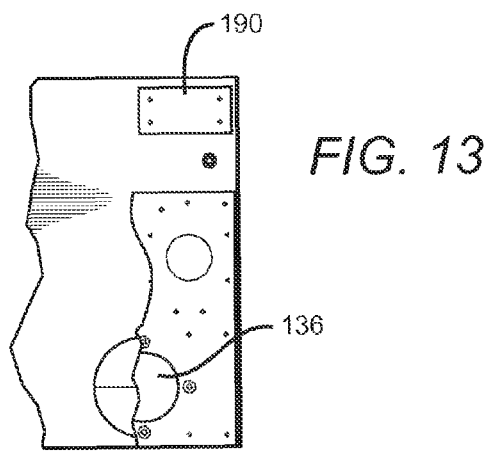
FIG. 13 is a cross-sectional view taken along lines 13-13 of FIG. 10.
Figure 15:
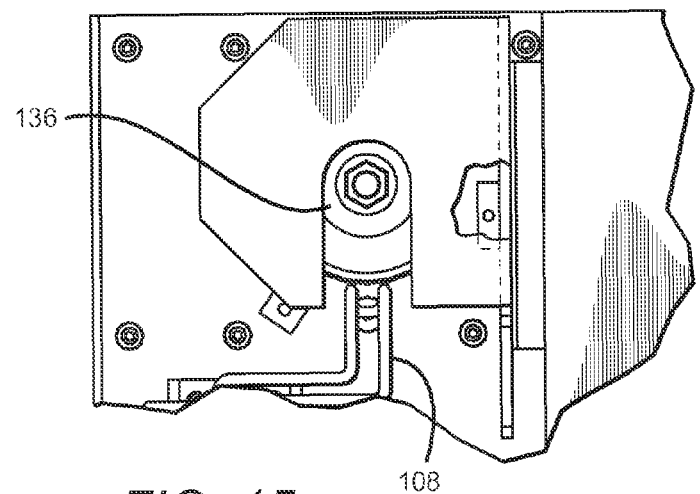
FIG. 15 is a top fragmentary portion of the friction stir welding tool cleaning apparatus of FIG. 8.
Figure 14:
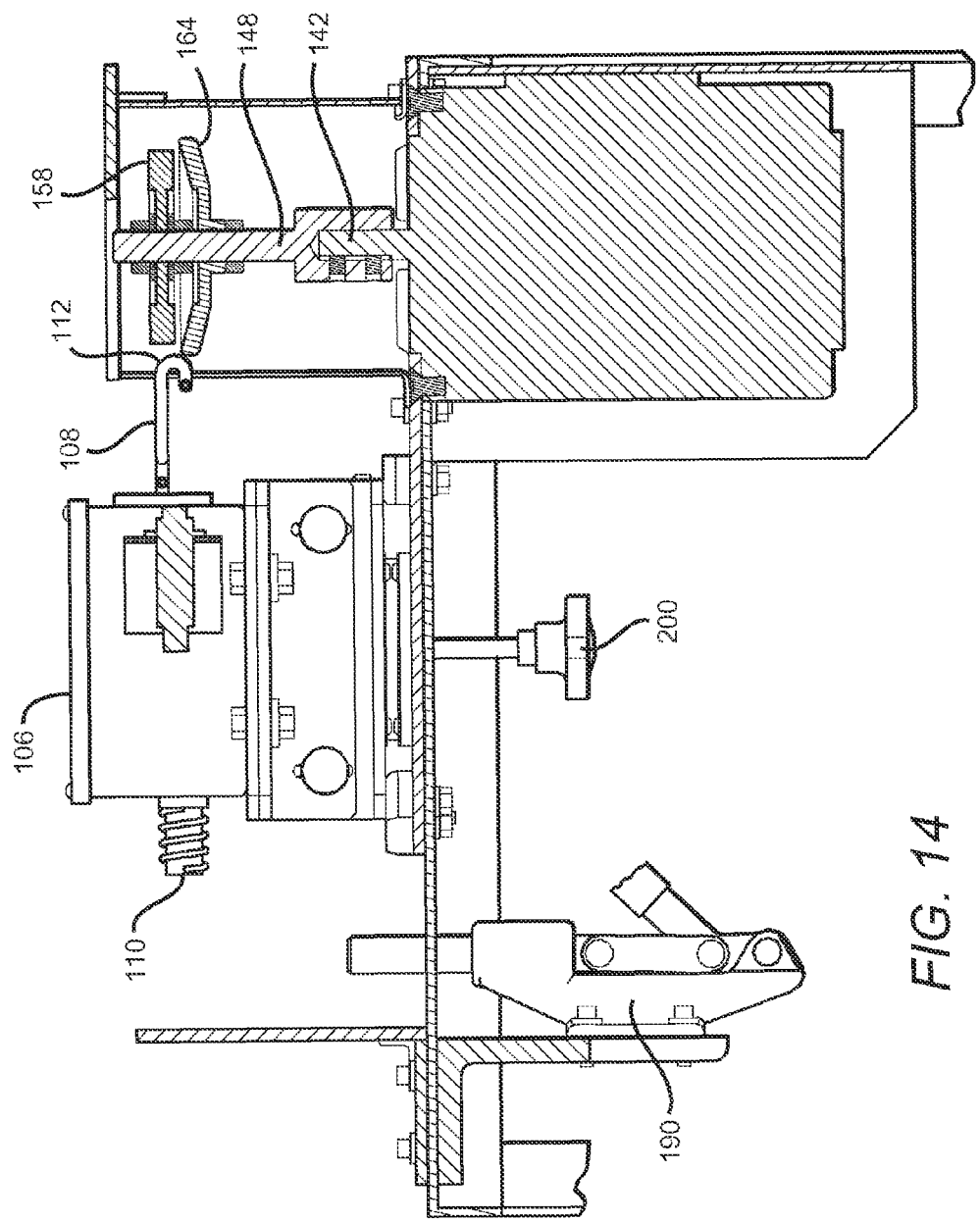
FIG. 14 is a cross-sectional view taken along lines 14-14 of FIG. 10.
Figure 16:
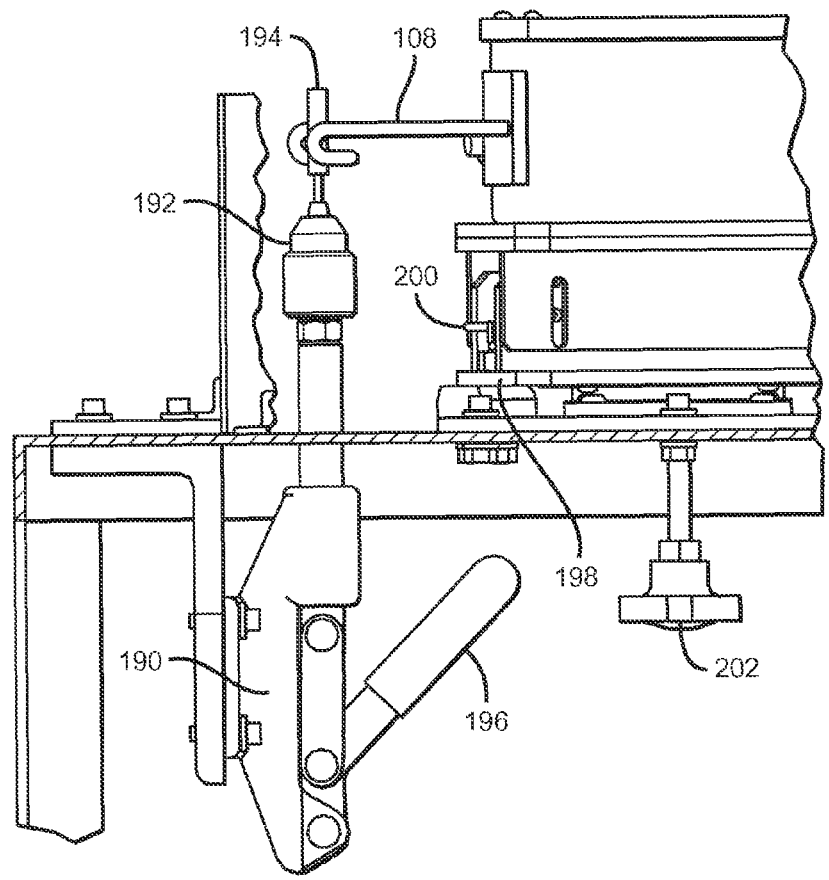
FIG. 16 is a side view of the bore cleaner component of the friction stir welding tool cleaning apparatus of the disclosure; and, FIG. 17 is a cross-sectional view of the rotating unit.
Figure 17:
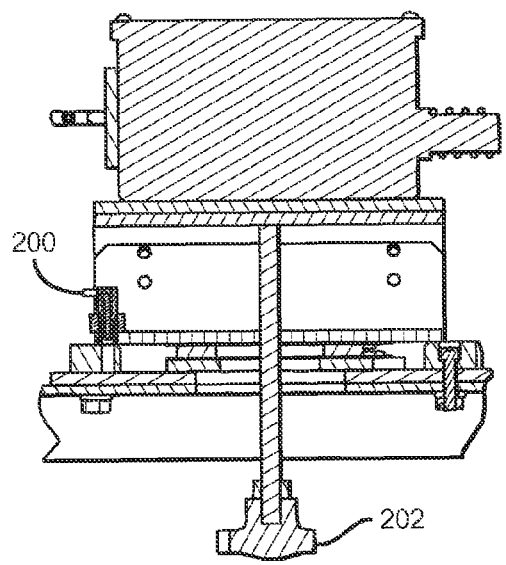

Another version or embodiment of the cleaning apparatus and system 100 of the disclosure is shown in FIGS. 8-17. In this embodiment, the apparatus has additional safety enclosures 182 and a bore cleaner component 190. FIG. 8 is a top perspective view illustrating this embodiment of the friction stir welding tool cleaning apparatus including further safety enclosures and the bore cleaner component. FIG. 9 is a back view of the apparatus of FIG. 8. FIG. 10 is a right side view of the apparatus of FIG. 8. FIG. 11 is a front view of the apparatus of FIG. 8. FIG. 12 is a top view of the apparatus of FIG. 8. FIG. 13 is a cross-sectional view taken along lines 13-13 of FIG. 10. FIG. 14 is a cross-sectional view taken along lines 14-14 of FIG. 10. FIG. 15 is a top fragmentary portion of the apparatus of FIG. 8. FIG. 16 is a side view of the bore cleaner component of the friction stir welding tool cleaning apparatus of the disclosure. As discussed above, friction stir welding machines often have either fixed pins or retractable pins. If the cleaning apparatus and system 100 of the disclosure is used to clean a retractable pin tool of a friction stir welding machine, the apparatus and system 100 further comprises the bore cleaner component 190, as fully shown in FIG. 16. The bore cleaner component 190 has a top area 192 with at least one brush element 194, and a lever 196 for raising and lowering the brush element 194. Preferably, the brush element 194 is in the form of a pipe cleaner with stainless steel bristles and has a length of about 4 inches to about 6 inches. The brush element 194 may be manually raised and lowered with the lever 196, or in an alternative embodiment, the brush element may be automated and raised and lowered automatically with a control device. The bore cleaner component is for cleaning retractable pin tools only and cannot be used to clean fixed pin tools. The bore cleaner component contacts and removes weld process residue material that adheres to the bore of the shoulder tool during the welding process because with a retractable pin tool, the pin tool slides down through the shoulder tool during the welding process. Preferably, the bore cleaner component is adapted for cleaning an inner portion or inner diameter of a shoulder portion of the friction stir welding tool when the friction stir welding tool has a retractable pin tool component. Thus, it is advantageous to clean the residue from the inner diameter of the shoulder tool to enhance the inspection process, eliminate or minimize tool changes that are not required, and allow for precise load and torque measurements critical for adaptive and load control modes. The brush element may be heated by rotating the induction coil from the tool cleaner component 136 on a rotating unit 198 and locking the induction coil in place with a locking lever 200 (see FIG. 16). The induction coil may be raised or lowered with a coil height adjustment screw 202. FIG. 17 is a cross-sectional view of the rotating unit.

In another embodiment of the disclosure, there is provided a method for cleaning a friction stir welding tool preferably using the embodiments of the friction stir welding tool cleaning apparatuses discussed above. The method of the disclosure is capable of cleaning and removing excess weld process residue material from fixed pin and retractable pin friction stir welding tools. The method is designed to clean one friction stir welding tool at a time after the tool has been used in the welding process. Clean friction stir welding tools are easier to inspect for damage if they are cleaned properly. Before the tools are certified for the welding process, they must go through an inspection process. The inspection process will automatically initialize a program offset if tool length or other detail of a particular tool is in and out of tolerance condition. If a build-up of weld process residue material is detected on a tool and an improper offset is loaded into the inspection system, the final result could be improper weld length. The disclosed method effectively cleans friction stir welding tools so as to eliminate or minimize improper or incorrect readings.

The method of cleaning a friction stir welding tool having a weld process residue material on a surface of the tool comprises the step of activating a friction stir welding machine so that the friction stir welding tool having the process residue material moves in a first rotational direction 180. The method preferably is used with a conventional friction stir welding machine 102, such as a friction stir welding machine similar to one such as manufactured by Brotje of Germany. However, another suitable friction stir welding machine may also be used. Preferably, the process residue comprises aluminum, copper, bronze, zinc, plastic, or another type of soft material. The method further comprises the step of heating for an effective period of time the friction stir welding tool having the weld process residue until the tool reaches an effective temperature, such that the weld process residue material is heated and transformed from a solid weld process residue material to a plasticized weld process residue material. A sensor has to integrate into the controller component. It can sense where there is a friction stir welding tool with residue on it that needs to be cleaned and then it automatically turns itself on, activates the heating component, and moves the tool in close proximity to the heater. The induction heater 106 is configured to heat around the tool 114, such that tool 114 is resistively heated to a desired temperature. Preferably, the induction heater is similar to one such as obtained from Magneforce, Inc. of Michigan. Preferably, the friction stir welding tool comprising the pin and shoulder is moved to a designated area manipulated by an automatic Computer Numerical Control (CNC) machine program. When the friction stir welding tool approaches the apparatus of the disclosure, a proximity sensor may be used to automatically energize the heating component or induction heating coil and the tool is moved into place in close proximity to the heating component. Preferably, the induction coil heating component is positioned about a half inch to an inch from the exterior of the friction stir welding tool. The spindle of the friction stir welding machine is energized and rotates until an effective tool temperature is reached, as designated by an external temperature sensor. The effective temperature is the temperature at which the process residue material effectively transforms from a solid phase residue material to a plasticized or softened phase residue material. With a friction stir welding tool made of the material MP 159 aluminum, preferably, the tool is heated to 900 degrees Fahrenheit. The tool is heated to an effective temperature so as not to overheat the tool, and preferably not to heat the tool to a temperature of greater than 950 degrees Fahrenheit. The effective period of time for heating the friction stir welding tool in order to transform the process residue material from a solid phase to a plasticized phase may be about 20-40 seconds. The method further comprises the step of contacting the friction stir welding tool with a tool cleaner component when the effective temperature is attained, rotating the tool cleaner component in a second rotational direction 178 counter to or opposite from the first rotational direction 180, and removing with the tool cleaner component the plasticized process residue material from the surface of the tool for an effective period of time until all or substantially all of the residue material is removed from the surface of the tool. The effective period of time for cleaning the friction stir welding tool and removing with the tool cleaner component the plasticized process residue material from the surface of the tool is preferably about 20-40 seconds. Preferably, the tool cleaner component comprises, as discussed above, a plurality of rotatable steel wire wheels having steel wire elements extending from the steel wire wheels. The motorized wire wheel brushes of the cleaner component may be energized either manually or with an on/off switch or with a sensor in the form of a Programmable Logic Control (PLC) controller that activates the wire wheel brushes once it receives a signal that the tool has reached an effective temperature. Preferably, the sensor is adapted to provide an output signal indicative of at least one of a force coincident with axial displacement of the spindle shaft and an axial position of the spindle shaft. Once the effective temperature of the tool is reached and the wire wheel brushes are activated, the plasticized and softened process residue material can easily be removed by the rotating and heated wire wheel brushes. The wire wheel brushes rotate in one direction while the tool in the friction stir welding spindle rotates in the counter and opposite direction. The controller component is used to set the power level, heating duration, temperature, or any of the combinations of controllable parameters. The heating component or induction heating coil extends in a horseshoe shape and uniformly heats the tool as it spins on its centerline axis. Opposite the induction heating coil are the rotating wire wheel brushes that rotate and remove the residue from the tool when the tool is heated to the effective temperature. Heat from the tool and induction coil may radiate to the wire wheel brushes. The rotating wire wheel brushes contact the heated tool with a surface having weld process residue material, and due to the combination of heat and configuration of the cleaner component, the weld process residue material is effectively or substantially removed from the pin and shoulder of the tool. The method is designed to clean a tapered pin along with a scroll shoulder surface adjacent to the pin. The method and apparatus may be used with varying parameters to cover multiple pin tapers, shoulder size combinations, and materials. Used or previously processed tools can be cleaned before they are presented to an inspection station. By cleaning the friction stir welding tools prior to inspection, improved process compliance can be attained. In addition, the method and apparatus of the disclosure reduce the inspection cycles for damaged and embedded materials and enhance the inspection process, possibly limiting tool changes that are not required and allow for precise load and torque measurements critical for adaptive and load control modes. Once the tool is effectively cleaned, the method further comprises the step of cooling the friction stir welding tool to ambient temperature. The heating component is turned off and the tool and cleaning apparatus cool down naturally and in real time to ambient temperature. The total cycle time for cleaning the tool with the tool cleaner component depends on the type of tool used but on average takes about 1.5 minutes to about 2 minutes. Preferably, the temperature indicator component used to indicate the temperature in the method is an optical pyrometer, such as an optical pyrometer obtained from and manufactured by Omega Engineering, Inc. of Stamford, Conn. The optical pyrometer may also be a two color pyrometer and may be a time based process. Preferably, the tool cleaner component used in the method is one such as obtained from Magneforce, Inc. of Michigan. Preferably, the controller component used in the method is one such as obtained from Magneforce, Inc. of Michigan.

If the method of the disclosure is used to clean a friction stir welding tool having a retractable pin tool, prior to the cooling step, the method comprises the step of contacting an inner portion or inner diameter of a shoulder portion of the friction stir welding tool with a bore cleaner component when the tool reaches an effective temperature, and removing with the bore cleaner component the plasticized process residue material from the inner portion of the shoulder portion for an effective period of time until all or substantially all of the residue material is removed from the inner portion of the shoulder portion. When the effective temperature is reached, the bore cleaner contacts and removes the plasticized process residue material from the inner diameter of the shoulder portion. The effective period of time for cleaning the inner diameter of the shoulder portion is on average between about 1.5 minutes to about 2 minutes. Preferably, the bore cleaner component comprises at least one steel wire brush. Preferably, the total cycle time for the entire method for cleaning a friction stir welding tool with a retractable pin is about 3 minutes to about 4 minutes. The friction stir welding tool cleaning apparatus method of the disclosure can be used in a variety of applications, including, for example, aeronautical and aerospace structures and aircraft, ship building materials, automobiles, and medical products.

Many modifications and other embodiments of the disclosure will come to mind to one skilled in the art to which this disclosure pertains having the benefit of the teachings presented in the foregoing descriptions and the associated drawings. It is to be understood that the disclosure is not limited to the specific embodiments disclosed, that modifications and other embodiments are intended to be included within the scope of the appended claims. Although specific terms are employed herein, they are used in a generic, descriptive sense only and not for purposes of limitation.

What is claimed is:

1. An apparatus for cleaning a friction stir welding tool having a weld process residue material on a surface of the tool, the apparatus comprising:

a heating component for heating a non-consumable friction stir welding tool having weld process residue material remaining on the surface of the tool after the tool has been used in a friction stir welding process, wherein the tool is heated to an effective temperature that does not overheat the tool and that heats and transforms the process residue material from a solid process residue material to a plasticized process residue material;

a temperature indicator component for indicating the effective temperature of the tool;

a tool cleaner component for removing the plasticized process residue material from the tool, wherein when the effective temperature is reached, the tool cleaner component contacts and removes the plasticized process residue material from the tool; and, a controller component for distributing power to the heating component, to the temperature indicator component, and to the tool cleaner component.

2. The apparatus of claim 1 further comprising a bore cleaner component for cleaning an inner portion of a shoulder portion of the tool when the tool has a retractable pin tool component.

3. The apparatus of claim 2 wherein the bore cleaner component contacts and removes plasticized process residue material from the inner portion of the shoulder portion when the effective temperature is reached.

4. The apparatus of claim 2 wherein the bore cleaner component comprises at least one steel wire brush.

5. The apparatus of claim 1 further comprising a power supply component electronically connected to the heating component.

6. The apparatus of claim 1 wherein the heating component comprises an induction heater having an induction coil.

7. The apparatus of claim 1 wherein the temperature indicator component is selected from the group comprising an optical pyrometer and an infrared device.

8. The apparatus of claim 1 wherein the tool cleaner component includes a plurality of rotatable steel wire wheels having steel wire elements extending from the steel wire wheels.

9. The apparatus of claim 1 wherein the tool cleaner component is shielded by a safety enclosure to prevent escape of unwanted process residue material when the tool is cleaned.

10. The apparatus of claim 1 wherein the process residue material is selected from the group consisting of aluminum, copper, bronze, zinc and plastic.

11. An apparatus for cleaning a friction stir welding tool having a weld process residue material on a surface of the tool, where the friction stir welding tool has a retractable pin tool component, the apparatus comprising:

a heating component for heating a non-consumable friction stir welding tool having weld process residue material remaining on the surface of the tool after the tool has been used in a friction stir welding process, wherein the tool is heated to an effective temperature that does not overheat the tool and that heats and transforms the process residue material from a solid process residue material to a plasticized process residue material;

a temperature indicator component for indicating the effective temperature of the tool;

a tool cleaner component for removing the plasticized process residue material from the tool, wherein when the effective temperature is reached, the tool cleaner component contacts and removes the plasticized process residue material from the tool;

a controller component for distributing power to the heating component, to the temperature indicator component, and to the tool cleaner component; and, a bore cleaner component for cleaning an inner portion of a shoulder portion of the tool, wherein when the effective temperature is reached, the bore cleaner component contacts and removes plasticized process residue material from the inner portion of the shoulder portion of the tool.

12. The apparatus of claim 11 wherein the heating component comprises an induction heater having an induction coil.

13. The apparatus of claim 11 wherein the temperature indicator component is selected from the group comprising an optical pyrometer and an infrared device.

14. The apparatus of claim 11 wherein the tool cleaner component includes a plurality of rotatable steel wire wheels having steel wire elements extending from the steel wire wheels.

15. The apparatus claim of claim 11 wherein the bore cleaner component comprises at least one steel wire brush.

16. The apparatus of claim 11 wherein the process residue material is selected from the group consisting of aluminum, copper, bronze, zinc and plastic.

17. An apparatus for cleaning a friction stir welding tool having a weld process residue material on a surface of the tool, where the friction stir welding tool has a retractable pin tool component, the apparatus comprising:

a heating component for heating a non-consumable friction stir welding tool having weld process residue material remaining on the surface of the tool after the tool has been used in a friction stir welding process, wherein the tool is heated to an effective temperature that does not overheat the tool and that heats and transforms the process residue material from a solid process residue material to a plasticized process residue material;

a power supply component electronically connected to the heating component;

a temperature indicator component for indicating the effective temperature of the tool;

a tool cleaner component for removing the plasticized process residue material from the tool, wherein when the effective temperature is reached, the tool cleaner component contacts and removes the plasticized process residue material from the tool;

one or more safety enclosures surrounding the tool cleaner component to prevent escape of unwanted process residue material when the tool is cleaned;

a controller component for distributing power to the heating component, to the temperature indicator component, and to the tool cleaner component; and, a bore cleaner component for cleaning an inner portion of a shoulder portion of the tool, wherein when the effective temperature is reached, the bore cleaner component contacts and removes plasticized process residue material from the inner portion of the shoulder portion of the tool.

18. The apparatus of claim 17 wherein the heating component comprises an induction heater having an induction coil.

19. The apparatus of claim 17 wherein the bore cleaner component comprises at least one steel wire brush.

20. The apparatus of claim 17 wherein the process residue material is selected from the group consisting of aluminum, copper, bronze, zinc and plastic.

* * * * *